Patented Mar. 30, 1948

2,438,882

UNITED STATES PATENT OFFICE 2,438,882

RECOVERY OF RIBONOLACTONE

Leo H. Sternbach, Montclair, N. J., assignor to Hoffmann-La Roche Inc., Nutley, N. J., a corporation of New Jersey No Drawing. Application February 12, 1946, Serial No. 647,200

3 Claims. (Cl. 260—344)

This invention relates to the recovery of d-ribono-lactone.

The prior art discloses the recovery of d-ribono-lactone, from crude compositions containing the same, by the use of cadmium hydroxide and hydrogen sulfide. Heretofore, d-ribono-lactone was obtained by the epimerization of arabonic acid by heating a mixture of arabonic acid and pyridine. Since arabonic acid is normally available in the form of its calcium salt, it was customary to prepare free arabonic acid by removing the calcium, for example, as insoluble calcium oxalate, from a solution of calcium arabonate, and epimerizing the arabonic acid by heating in the presence of pyridine. The final product contained arabonic acid and ribonic acid. The two epimers present in this reaction mixture were converted to their calcium salts by means of $CaCO_3$, then separated in the form of their calcium salts, the calcium arabonate being removed in crystal form. The calcium ribonate residue was then treated with oxalic acid, whereby insoluble calcium oxalate was formed. This insoluble salt was removed leaving a composition containing ribonic acid. This latter composition was then treated with freshly prepared cadmium hydroxide, and filtered. After filtration, the solution was concentrated, and the cadmium ribonate, which crystallized out, was separated. In order to liberate free ribonic acid, the cadmium ribonate was treated with hydrogen sulfide in a very dilute boiling solution. The cadmium sulfide was then filtered off, the filtrate concentrated, and the ribono-lactone was recrystallized thereferom.

I have discovered that d-ribono-lactone can be recovered from compositions containing d-ribonic acid and/or d-ribono-lactone, by the following process. The composition containing the acid and/or the lactone is treated with a solvent for the acid and/or lactone, suitable solvents being ethanol, methanol, or acetone. Thereafter there is added an organic solvent for said acid and/or lactone which, however, has a lesser solvent action for the acid and/or lactone than the initial solvent. For example, I may employ for this purpose propanol or butanol. Thereafter, the initial solvent is completely removed by distillation and ribono-lactone is recovered, e. g., by seeding the residual solution.

The significance of the invention will be made apparent by the following illustrative examples.

Example 1

A mixture of 500 g. calcium-d-arabonate and 1000 g. distilled water is heated for 3½ hours in an autoclave at 130–140°. The hot solution is decolorized with 25 g. activated charcoal, filtered and left for 15 hours at 0° C. The crystalline precipitate of calcium-arabonate is filtered off and washed with water. The solution is concentrated in water pump vacuo to 260 g., seeded with calcium-arabonate and left for about three days at 0° C. A second crop of calcium-arabonate is filtered off. The filtrate is diluted to 400 g., freed from calcium-ions with 38 g. oxalic acid, filtered and concentrated in water pump vacuo to 210 g. After 5–10 days, the solution is concentrated in water pump vacuo to a viscous sirup (about 90 g.). This sirup is dissolved in 50 g. methanol, and 350 g. n-butanol are then added. All the methanol and a small part of the butanol are distilled off. The residual solution (350 g.) is seeded with d-ribono-lactone and left at room temperature for a few hours. After 6–14 hours, after a substantial amount of crystals has deposited, the solution is concentrated in water pump vacuo at a bath temperature of 45° to 120–140 g. The mixture is left for a few hours at room temperature and then cooled for two days at 0° C. The precipitated crystalline d-ribono-lactone is filtered off and washed with butanol.

Example 2

A mixture of 500 g. calcium-d-arabonate and 1000 g. distilled water is heated for 3½ hours in an autoclave at 130–140°. The hot solution is decolorized with 25 g. activated charcoal, filtered and left for 15 hours at 0° C. The crystalline precipitate of calcium-arabonate is filtered off and washed with water. The solution is concentrated in water pump vauco to 260 g., seeded with calcium-arabonate and left for about three days at 0° C. A second crop of calcium-arabonate is filtered off. The filtrate is diluted to 400 g., freed from calcium-ions with 38 g. oxalic acid, filtered and concentrated in water pump vacuo to 210 g. After 5–10 days, the solution is concentrated in water pump vacuo to a viscous sirup (about 90 g.). This sirup is dissolved in 50 g. acetone, and 350 g. n-butanol are then added. All the acetone and a small part of the butanol are distilled off. The residual solution (350 g.) is seeded with d-ribono-lactone and left at room temperature for a few hours. After 6–14 hours, after a substantial amount of crystals has deposited, the solution is concentrated in water pump vacuo at a bath temperature of 45° to 120–140 g. The mixture is left for a few hours at room temperature and then cooled for two days at 0° C. The precipitated crystalline d-ribono-lactone is filtered off and washed with butanol.

Example 3

A mixture of 500 g. of calcium-d-carbonate, 5–40 g. calcium hydroxide, and 1000 g. distilled water is heated for 2½ hours in an autoclave at 130–140°. The hot solution is neutralized with carbon dioxide, decolorized with 25 g. activated charcoal, filtered and left for 15 hours at 0° C. The crystalline precipitate of calcium-arabonate is filtered off and washed with water. The solution is concentrated in water pump vacuo to 260 g., seeded with calcium-arabonate, and left for about three days at 0° C. A second crop of calcium-arabonate is fitered off. The filtrate is diluted to 400 g., freed from calcium-ions with 42 g. oxalic acid, filtered and concentrated in water pump vacuo to 210 g. After 5–10 days the solution is concentrated in water pump vacuo to a viscous sirup (about 90 g.). This sirup is dissolved in 40 grams methanol, and 350 g. n-butanol are then added. The methanol and a small part of the butanol are distilled off. The residual solution (350 g.) is seeded with d-ribono-lactone and left at room temperature for a few hours. After 6–14 hours, after a substantial amount of crystals has deposited, the solution is concentrated in water pump vacuo at a bath temperature of 45° to 120–140 g. The mixture is left for a few hours at room temperature and then cooled for two days at 0° C. The precipitated crystalline d-ribono-lactone is filtered off and washed with butanol.

Example 4

A mixture of 500 g. calcium-d-arabonate, 5–40 g. calcium hydroxide, and 1000 g. distilled water is heated for 2½ hours in an autoclave at 130–140°. The hot solution is neutralized with carbon dioxide, decolorized with 25 g. activated charcoal, filtered and left for 15 hours at 0° C. The crystalline precipitate of calcium-arabonate is filtered off and washed with water. The solution is concentrated in water pump vacuo to 260 g., seeded with calcium-arabonate, and left for about three days at 0° C. A second crop of calcium-arabonate is filtered off. The filtrate is diluted to 400 g., freed from calcium-ions with 42 g. oxalic acid, filtered and concentrated in water pump vacuo to 210 g. After 5–10 days the solution is concentrated in water pump vacuo to a viscous sirup (about 90 g.). The sirup is dissolved in 40 grams acetone, and 350 g. n-butanol are then added. The acetone and a small part of the butanol are distilled off. The residual solution (350 g.) is seeded with d-ribono-lactone and left at room temperature for a few hours. After 6–14 hours, after a substantial amount of crystals has deposited, the solution is concentrated in water pump vacuo at a bath temperature of 45° to 120–140 g. The mixture is left for a few hours at room temperature and then cooled for two days at 0° C. The precipitated crystalline d-ribono-lactone is filtered off and washed with butanol.

I claim:

1. Process for treating a composition containing a member of the group consisting of d-ribonic acid and d-ribono-lactone, which comprises treating said composition with an organic solvent for said member, thereafter adding another organic solvent for said member having a lesser solvent action therefor than the initial solvent, removing said initial solvent by distillation, and recovering d-ribono-lactone from the concentrated residue.

2. The process of claim 1, in which the initial solvent is methanol and the second solvent is butanol.

3. The process of claim 1 in which the initial solvent is ethanol and the second solvent is butanol.

LEO H. STERNBACH.

REFERENCES CITED

The following references are of record in the file of this patent:

Chemical Abstracts, vol. 30 (1936), page 4469.

Certificate of Correction

Patent No. 2,438,882. March 30, 1948.

LEO H. STERNBACH

It is hereby certified that errors appear in the printed specification of the above numbered patent requiring correction as follows: Column 1, line 45, for "and/for" read *and/or*; column 3, line 5, Example 3, for "500 g. of calcium-d-carbonate," read *500 g. calcium-d-arabonate,*; and that the said Letters Patent should be read with these corrections therein that the same may conform to the record of the case in the Patent Office.

Signed and sealed this 1st day of June, A. D. 1948.

[SEAL]

THOMAS F. MURPHY,
*Assistant Commissioner of Patents.*